US010141683B2

(12) United States Patent
Czyzewski et al.

(10) Patent No.: US 10,141,683 B2
(45) Date of Patent: Nov. 27, 2018

(54) CABLE FITTING FOR CONNECTING A HIGH-VOLTAGE CABLE TO A HIGH-VOLTAGE COMPONENT OR ANOTHER HIGH-VOLTAGE CABLE

(71) Applicant: ABB Schweiz AG, Baden (CH)

(72) Inventors: Jan Czyzewski, Cracow (PL); Victoria Maurer, Solothurn (CH); Radim Lichy, Alingsås (SE); Torbjörn Sörqvist, Alingsås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/935,738

(22) Filed: Mar. 26, 2018

(65) Prior Publication Data
US 2018/0219323 A1 Aug. 2, 2018

Related U.S. Application Data

(63) Continuation of application No. PCT/EP2016/072488, filed on Sep. 22, 2016.

(30) Foreign Application Priority Data

Sep. 25, 2015 (EP) .................................. 15186898

(51) Int. Cl.
H01R 13/58 (2006.01)
H01R 13/53 (2006.01)
(Continued)

(52) U.S. Cl.
CPC ......... H01R 13/53 (2013.01); H01R 13/5205 (2013.01); H01R 13/59 (2013.01); H02G 15/007 (2013.01); H02G 15/107 (2013.01)

(58) Field of Classification Search
CPC .... H01R 13/53; H01R 13/59; H01R 13/5205; H02G 15/007; H02G 15/107
(Continued)

(56) References Cited

U.S. PATENT DOCUMENTS 2,800,526 A * 7/1957 Moorhead ............... H02G 3/083
16/2.1
3,401,370 A * 9/1968 Weinfurt ................ H01R 13/53
174/11 BH
(Continued)

FOREIGN PATENT DOCUMENTS

DE 2609079 B1 9/1977
DE 3243690 A1 5/1984
(Continued)

OTHER PUBLICATIONS

European Patent Office, International Search Report & Written Opinion issued in corresponding Application No. PCT/EP2016/072488, dated Dec. 15, 2016, 13 pp.
(Continued)

Primary Examiner — Abdullah Riyami
Assistant Examiner — Nelson R Burgos-Guntin
(74) Attorney, Agent, or Firm — Taft Stettinius & Hollister LLP; J. Bruce Schelkopf

(57) ABSTRACT

A high-voltage cable fitting with a rigid core insulator that has a first conical outer surface extending concentrically about a longitudinal axis. An elastomeric stress relief element has a first conical inner surface is designed for mating the first conical outer surface at an interface. A rigid member is provided for pressurizing the elastomeric stress relief element at the interface. The stress relief element is pressed onto the rigid core insulator. The rigid member has at least one pressure enhancing portion extending circumferential about the longitudinal axis for causing an additional axial expansion stress in a sleeve portion of the stress relief element extending along the first conical outer surface of the core insulator in an assembled state of the cable fitting.

17 Claims, 6 Drawing Sheets

(51) Int. Cl.
*H01R 13/52* (2006.01)
*H02G 15/107* (2006.01)
*H02G 15/007* (2006.01)
*H01R 13/59* (2006.01)

(58) Field of Classification Search
USPC .................. 439/449, 453, 455, 459, 607.51
See application file for complete search history.

(56) References Cited

U.S. PATENT DOCUMENTS

| | | | | | |
|---|---|---|---|---|---|
| 3,711,818 | A | * | 1/1973 | Swehla | H01H 9/085 174/73.1 |
| 3,744,008 | A | * | 7/1973 | Castellani | H02G 3/0658 174/652 |
| 3,805,218 | A | * | 4/1974 | Voida | H01B 7/04 174/107 |
| 3,861,777 | A | * | 1/1975 | Clark | H01B 17/301 174/152 R |
| 4,336,977 | A | * | 6/1982 | Monaghan | G02B 6/3887 174/84 C |
| 4,627,673 | A | * | 12/1986 | Barrus, Jr. | H01R 12/775 439/92 |
| 4,931,023 | A | * | 6/1990 | Browne | F21L 14/026 439/457 |
| 4,946,393 | A | * | 8/1990 | Borgstrom | H01R 13/53 324/122 |
| 5,023,402 | A | * | 6/1991 | King, Jr. | H01R 4/22 174/87 |
| 5,030,135 | A | * | 7/1991 | Plesinger | G02B 6/4478 174/135 |
| 5,616,049 | A | * | 4/1997 | Schwager | H01R 13/533 439/455 |
| 5,626,491 | A | * | 5/1997 | Hasircoglu | H01R 12/772 439/459 |
| 5,908,332 | A | * | 6/1999 | Varreng | H01R 13/53 439/607.58 |
| 6,050,855 | A | * | 4/2000 | Varreng | H01R 13/53 439/181 |
| 6,439,929 | B1 | * | 8/2002 | Jenets | H01R 9/032 439/276 |
| 7,422,469 | B1 | * | 9/2008 | Chang | B29C 45/14467 439/449 |
| 7,955,132 | B2 | * | 6/2011 | Luo | H01R 12/62 439/607.41 |
| 8,556,649 | B2 | * | 10/2013 | Nolting | H01R 13/506 439/455 |
| 2012/0071014 | A1 | | 3/2012 | Dais et al. | |
| 2014/0073176 | A1 | * | 3/2014 | Plant | H01R 13/523 439/519 |
| 2015/0207265 | A1 | * | 7/2015 | Plant | H01R 13/523 439/271 |
| 2016/0126641 | A1 | * | 5/2016 | Lewin | H01R 4/20 439/86 |

FOREIGN PATENT DOCUMENTS

| | | |
|---|---|---|
| DE | 19945148 A1 | 3/2001 |
| EP | 0731994 B1 | 10/1999 |
| EP | 2431982 A1 | 3/2012 |
| GB | 2254493 A | 10/1992 |

OTHER PUBLICATIONS

European Patent Office, International Preliminary Report on Patentability issued in corresponding Application No. PCT/EP2016/072488, dated Nov. 30, 2017, 18 pp.

European Patent Office, Extended Search Report issued in corresponding Application No. 15186898.1, dated Mar. 7, 2016, 7 pp.

* cited by examiner

CABLE FITTING FOR CONNECTING A HIGH-VOLTAGE CABLE TO A HIGH-VOLTAGE COMPONENT OR ANOTHER HIGH-VOLTAGE CABLE

TECHNICAL FIELD

The invention relates to a cable fitting for connecting a high-voltage cable to a high-voltage component such as dealt in international patent class H02G15. Such a cable fitting usually is designed as a cable end termination, for example a high-voltage outdoor cable end termination for application in a voltage range from 52 kV up to 1100 kV. The cable end termination can also be designed as a high-voltage indoor cable end termination, typically for a transformer or for a high-voltage gas-insulated switchgear component. Alternatively, the cable fitting is designed as a high-voltage cable junction used for connecting two high voltage cables together.

In general the high voltage can range from at least 1 kV to more than 1200 kV.

BACKGROUND ART

Known high-voltage cable end terminations and cable junctions typically comprise a rigid core insulator and an electrically insulating, elastomeric stress relief element coaxially arranged around a longitudinal axis and matching the rigid core insulator through a conical interface and an axially aligned current path. The current path connects a cable conductor encased in an insulation of the cable to a high-voltage current terminal arranged within the rigid core insulator. EP0731994B2 is a representative of such prior art. During operation of a high-voltage component the current path in general continuously conducts a rating current.

The rigid core insulator can be formed as a fine graded condenser core with a number of concentric electrically conductive field-grading layers arranged around the current conductor path and embedded in an insulating material, such as described in DE19945148A1. Said field grading layers are commonly produced in that at least two electrically conductive aluminum field grading layers are inserted in between neighboring spacer layers during the winding process of the condenser core. In particular, the core insulator can be produced using resin-impregnated paper technology in which crepe insulating paper is used as the spacer sheet material. After completing the winding process, the condenser body is impregnated by an epoxy resin followed by a hardening/curing process.

Moreover, the cable is fixed to a base part of the termination, for example a flange in case of a cable bushing, by a cable clamp and enters the interior of the termination through a stress relief element, e.g. a stress relief cone. The function of the stress relief element is to provide a smooth transition of the very high electric field in the electric insulation of the cable into a much lower electric field in the interior of the termination.

Basically, there are two interface design approaches known in the art. The first design approach resides on a so-called inner cone concept where the rigid core insulator has a conical portion that is directed radially inwards with respect to a longitudinal axis defined by the columnar overall shape of the core insulator. The stress relief element has a conical shell portion that is directed radially outwards matching the shape of the conical portion of the core insulator such that an interface is formed. The second design approach resides on a so-called outer cone concept where the core insulator has a conical portion that is directed radially outwards with respect to the longitudinal axis. The stress relief element has a conical shell portion that is directed radially inwards matching the shape of the conical portion of the core insulator such that an interface is formed again. EP0731994B2 is a representative of the second design approach. In both design approaches, the core insulator is typically comprising an epoxy-based resin or a similar non-conformable, rigid material, whereas the stress relief element is usually made of conformable, elastic elastomeric materials.

Both design approaches have in common that the mating quality of the interface needs to be superior such that no voids between the stress relief element and the conical portion of the core insulator are formed. This, because these voids are known to be responsible for causing a dielectric breakdown occurring along the interface between the rigid insulating element and the elastomeric stress relief element. In order to avoid forming voids at the interface large pressure is required to be exerted by the stress relief element against the surface of the core insulator. The pressure makes the elastic material of the stress relief element conform in such a way that the material fills all uneven imperfections of the surface of the core insulator. The pressure is also required at the interface between the inner surface of the stress relief element and the outer surface of the insulation of the cable entering the cable fitting.

The first design approach has the advantage over the second approach that it is easier to generate large and uniform pressure over both interfaces discussed above by using the stress relief element being made of soft elastomeric material and applying a force pressing the material into the space between the cable and the inner-cone opening in the core insulator. However, especially when a fine graded condenser core is used, the disadvantage resides in that the diameter of the high-voltage, typically innermost field grading layer has to be larger that the external diameter of the insulation of the cable making the overall diameter of the core insulator large. On the other hand, the second design approach leads to cable fittings having a smaller diameter of the core insulator compared to cable fittings of the first design approach designed for identical electric conditions because the second design approach allows for arranging the innermost field grading layer to be arranged more proximate to the conductor. The disadvantage of the second approach resides in that the required pressure exerted by the stress relief element on the core insulator is leads to comparatively bulky cable fittings having a comparatively large overall diameter.

GENERAL DISCLOSURE OF THE INVENTION

The object to be solved by the present invention resides in providing a satisfactory solution for forming a cable fitting according to the second design approach that allows achieving the required minimal interface pressure while having a compact overall diameter.

In a most basic embodiment of the inventive high-voltage cable fitting that high quality interface is achieved in that the high-voltage cable fitting comprises a rigid core insulator with a cavity for receiving a nominal conductor. The rigid core insulator has a first conical outer surface extending concentrically about a longitudinal axis defined by the columnar overall shape of the high voltage fitting. The cable fitting further has an elastomeric stress relief element having a first conical inner surface designed for mating the first conical outer surface over a predefined length at an interface, as well as a rigid member provided for pressurizing the elastomeric stress relief element at the interface. The term 'rigid' is understood as non-deformable when compared to the elastomeric stress relief element which is elastic and deformable. The stress relief element may be a so-called stress relief cone but shall not be understood as being limited to strict cone shapes only. The term 'conical surface' is to be understood as substantially conical, i.e. not cylindrical having a steady diameter over its length in the region of the interface.

At a given annular zone on the interface a diameter of the first conical inner surface is smaller than a diameter of the first conical outer surface in an unassembled state of the high-voltage cable fitting. The term 'at a given annular zone' is understood as any ring-shaped area extending circumferentially about the longitudinal axis at any place in the direction of the longitudinal axis. During the assembly process of the cable fitting at the cable, the stress relief element is pressed onto the rigid core insulator such that in an assembled state of the high-voltage cable fitting the stress relief element experiences circumferential expansion, generating in turn radial compression stress, and thus exerts a first radial compression force on the condenser core at each given annular zone.

The rigid member has at least one pressure enhancing portion extending circumferential about the longitudinal axis for causing an additional axial expansion stress in a sleeve portion of the stress relief element extending along the first conical outer surface of the core insulator in an assembled state of the cable fitting. Depending on the embodiment, the rigid member can be a closed, cup-shaped housing/casing or a cage or basket-like construction, for example.

The pressure enhancing portion is responsible for causing an additional axial expansion stress in the stress relief element. That additional axial expansion in term is responsible for causing a second radial compression force on the core insulator at the given annular zone on the interface in an assembled state of the high-voltage cable fitting. The pressure enhancing portion and the axial expansion stress in the stress relief element are concerted such that it causes the desired, pre-definable second radial compression force. The pre-definable second radial compression force is such that, added to the first radial compression force, it generates a total pressure, exerted by the stress relief element on the rigid insulator at the interface, larger than 0.1 MPa, preferably more than 0.3 MPa, for withstanding the required electric fields. Thus, maintaining the required pressure between the core insulator and the stress relief element allows to design these parts with reasonably large field and, at a defined rated voltage of the device, with reasonably small size in terms of dimension.

Summing up, the presence of not only a first radial compression force but also an additional second radial compression force provides for achieving a reliable long-lasting pressure on the core insulator and thus for an improved interface quality compared to known cable fittings.

A simple solutions in terms of complexity that is nonetheless effective is achievable if the stress relief element is cup-shaped and has an opening formed by the first conical inner surface. The stress relief element has a circumferential collar directed radially outwards with respect to the longitudinal axis and a first end face located at the entry of said opening. The rigid member has an inner contour for receiving the stress relief element. The pressure enhancing portion is located at the inner contour such that it engages with the collar such that an additional axial expansion stress in the sleeve portion of the stress relief element extending along the first conical outer surface of the core insulator is caused in an assembled state of the cable fitting. The technical effect associated with this pressure enhancing portion resides in that it pulls on the collar in the direction of the longitudinal axis such that a radially outer contour of the stress relief element is displaced in the direction of the longitudinal axis relative to the first conical inner surface resulting in additional elongation within the sleeve region of the stress relief element. The additional elongation in the sleeve portion leads to an additional axial stress and consequently to a tendency to radial contraction of the stress relief element with respect to the longitudinal axis. The tendency to radial contraction acting against the first outer conical surface of the rigid core insulator generates the desired second radial compression force. As a result the pressure of the satisfactory high value can be obtained at the interface between the stress relief element and the rigid core insulator with the small outer diameter of the stress relief element. Therefore the diameter at a given annular zone on the shell surface of the stress relief element is larger in an unassembled state of the cable fitting than in an assembled state of the cable fitting.

In case that the first end face of the collar is abutting a rigid counter-face, e.g. of a flange or the like, care has to be taken that the pressure enhancing portion is shaped and dimensioned and concerted with respect to the thickness of the collar in the direction of the longitudinal axis such that the collar is not damaged but just sufficiently pressurized to be pulled in the axial direction thus generating the additional axial expansion stress which is properly converted into the desired second compression force acting on the interface. Therefore, it is recommended that a minimal clearance in between the rigid counter-face and the pressure enhancing portion measures at least one third of a minimal wall thickness of the sleeve portion of the stress relief element.

If the dimensional tolerances of the stress relief element vary a lot or if there are large differences between thermal expansion coefficients of the rigid core insulator, the stress relief element and the rigid member, it may be advantageous to shape the inner contour of the rigid member in such a way that there is at least one of a ring-shaped first gap in between a lateral shell surface of the stress relief element and the inner contour of the rigid member and a ring-shaped second gap in between the collar of the stress relief element and the inner contour of the rigid member. That first gap accommodates the changes of dimensions caused by the varying tolerances or by thermal expansion or shrinkage of the components of the cable fitting.

A more advanced stress relief element is achievable if the rigid member of the cable fitting has an inner contour that is directed towards the stress relief member and the pressure enhancing portion comprises a plurality of stepped shoulders that are arranged at that inner contour at least in an area facing the first conical outer surface where the second compression force is desired. The plurality of stepped shoulders are inclined with respect to the longitudinal axis about an inclination angle. The stress relief element is cup-shaped and has an opening formed by the first conical inner surface and a first end face located at the entry of said opening. The stress relief element has an outer contour that is directed towards the rigid member and has a plurality of counter-shoulders for interacting with the stepped shoulders of the rigid member such that an additional axial expansion stress in the sleeve portion of the stress relief element is caused in an assembled state of the cable fitting.

The technical effect of such a pressure enhancing portion acting on the counter-shoulders of the stress relief element resides in that it serves for pulling the outer contour of the stress relief element such that it becomes displaced in the direction of the longitudinal axis relative to the first conical inner surface in an assembled state of the cable fitting resulting in additional elongation within the sleeve region of the stress relief element. The additional axial elongation in the sleeve portion leads to an additional axial stress and consequently to a tendency to radial contraction of the stress relief element with respect to the longitudinal axis. The tendency to radial contraction acting against the first outer conical surface of the rigid core insulator generates the desired second radial compression force. Care must be taken that the contact surface between the shoulder and the counter-shoulder is designed and sized properly with respect to resiliency value of the stress relief cone chosen in order to ensure that the axial force and thus axial pressure of the rigid member applied to the stress relief element does not lead to local damage at the counter shoulders of the stress relief element. Preferably, the minimal contact surface is of about 25% of the total surface of the counter-shoulder of the stress relief element.

In embodiments, where no or at least only very little radial shall be caused during the assembly process due to the pressing of the stress relief element onto the rigid core insulator and in operation of the cable fitting due to thermal expansion or contraction of the components of the cable fitting, it is advantageous if the inclination angle of the stepped shoulders is about 90 degrees.

In a yet refined embodiment, a support ring is arranged in between each one of the plurality of the shoulders and the counter-shoulders. These supports rings are rigid and mechanically stable, for example made of metal. Where required, a suitable grease like for example silicone grease may be provided between the end faces of the support rings and their dedicated shoulders to minimize the friction there. Hence, once the components of the cable fitting expand or shrink due to changes of temperatures during the operation of the cable fitting, the support rings will move against the rigid member and the elastomeric stress relief element will not need to move against the spacers. This is advantageous in that one avoids a local damage at the counter shoulders of the stress relief element which could be caused by rubbing against the shoulders of the rigid element.

Satisfactory values of the second radial compression force are achievable with a limited axial expansion stress of the stress relief element if the inclination angle of the stepped shoulders is in a range of 30 to 80 degrees with respect to the longitudinal axis.

In this embodiment, the force acting at the engaging surfaces, i.e. at the shoulders and counter-shoulders acts at an angle and thus has both axial- and radial force components. The axial force component of the force keeps the elastomeric element in position and generates axial expansion stress in the elastomeric stress relief element. The radial force component of the force produces additional pressure at the interface directly. The outer diameters of the elastomeric stress relief element can be further minimized.

In addition, such an embodiment also allows for a yet more advanced embodiment of a cable fitting where the inclination angles may vary for each step in order to allow a comparatively large design freedom and sufficient room for tuning and optimization, where needed.

In situations, where there is a need for even higher values of the second radial compression force, the cable fitting may be such that its pressure enhancing portion is a sleeve-shaped pressure body provided between the stress relief member and the rigid member. The pressure body has a second conical inner surface that is matching a second conical outer surface of the stress relief element at least in an area facing the first conical outer surface. A compression system is provided between an axial end face of the pressure body and the rigid member for exerting an axial force on the pressure body in an assembled state of the cable fitting such that an additional axial expansion stress in the sleeve portion of the stress relief element is caused in an assembled state of the cable fitting. The additional axial expansion stress in the sleeve portion leads to an elongation of the stress relief element and consequently to a tendency to radial contraction with respect to the longitudinal axis and thus to the desired second compression force.

The opening angle of the second conical inner surface of the pressure body is larger than the opening angle of the first conical outer surface. The pressure at the interface is generated not only by the circumferential elastic expansion of the stress relief element pressed on the rigid core insulator and by the second radial compression force resulting from axial expansion of the stress relief element generated by the pressure body but also by a fourth radial compression force resulting from a radial compression of the stress relief element by the pressure body pushed by the compression system. The advantage of this embodiment is that the fourth radial compression force can be adjusted to the required value by choosing the compression system generating the appropriate axial force. The thermal expansion of the rigid core insulator and the elastomeric stress relief element is absorbed by an axial movement of the pressure body against the force of the compression system.

The compression system may comprise a plurality of compression springs, for example helical compression springs that are provided at periodic intervals about the longitudinal axis. Alternatively, a ring-shaped elastic body made of a material that is harder than the stress relief element can be employed.

In particular in cases, where the cable fitting is formed as a cable terminal of a mechanical structure like a housing, for example, the cable fitting can comprise a rigid flange extending circumferentially about the rigid core insulator and having a second end face directed towards the first end face of the stress relief element. For compensating any dimensional tolerances and for providing space to allow a thermal expansion of the stress relief element, it is advantageous that there is a ring-shaped third gap in between the first end face of the stress relief element and the second end face of the flange as it avoids any superposition issues resulting of a third radial compression force.

Particularly compact cable fittings having small diameters at their thickest point of the rigid member are achievable if the rigid member has a bell-shaped cross-section with a tapered portion whose second cone angle is deviating from a first cone angle of the first conical outer surface by less than 30 degrees with respect to the longitudinal axis. Particularly advantageous interface properties are achievable if the first cone angle is in a range between 7 and 20 degrees.

In cases, where the electric field needs to be passively controlled, it is advantageous if the rigid core insulator is formed as a condenser core having at least one electrically conducting field grading layer enclosed in between neighboring spacer layers. The radially innermost field-grading layer is electrically connected to the high-voltage potential of the cable conductor and the radially outermost field-grading layer is electrically connected to the ground potential of a rigid flange, or the like. The set of the field-grading layers forms a capacitive field-grading system.

It is advantageous when the spacer layers contain multitude of fibers which are impregnated by a hardenable resin, for example epoxy resin, comprising inorganic filler particles. The casting and hardening of such filled resin can be made in a suitable mold which has an additional advantage that the high smoothness of the first conical outer surface can be obtained thus additionally increasing the quality of the interface.

In any HV applications, it is recommended, that an electrically conductive connector shield is integrated into the stress relief element such that it contacts the first conical outer surface of the core insulator at its thinner end in an assembled state of the cable fitting. Moreover, an electrically conductive field deflector is integrated into the stress relief element such that it contacts the first conical outer surface of the core insulator in an assembled state of the cable fitting at its thicker end and extends over an outer surface of the stress relief element.

The advantages relating to the cable fitting are likewise applicable to a high voltage apparatus comprising a cable fitting such as described above. In this case, a high voltage cable is connected to the conductor and the stress relief element is exerting a radial compression force on the high-voltage cable in that it is pressed on high-voltage cable.

BRIEF DESCRIPTION OF THE DRAWINGS

The description makes reference to the annexed drawings, which are schematically showing in FIG. 1 a cross section of a first embodiment of the cable fitting along a longitudinal axis.

In the drawings identical parts, currents and voltages are given identical reference characters.

WAYS OF WORKING THE INVENTION

Figure 1:
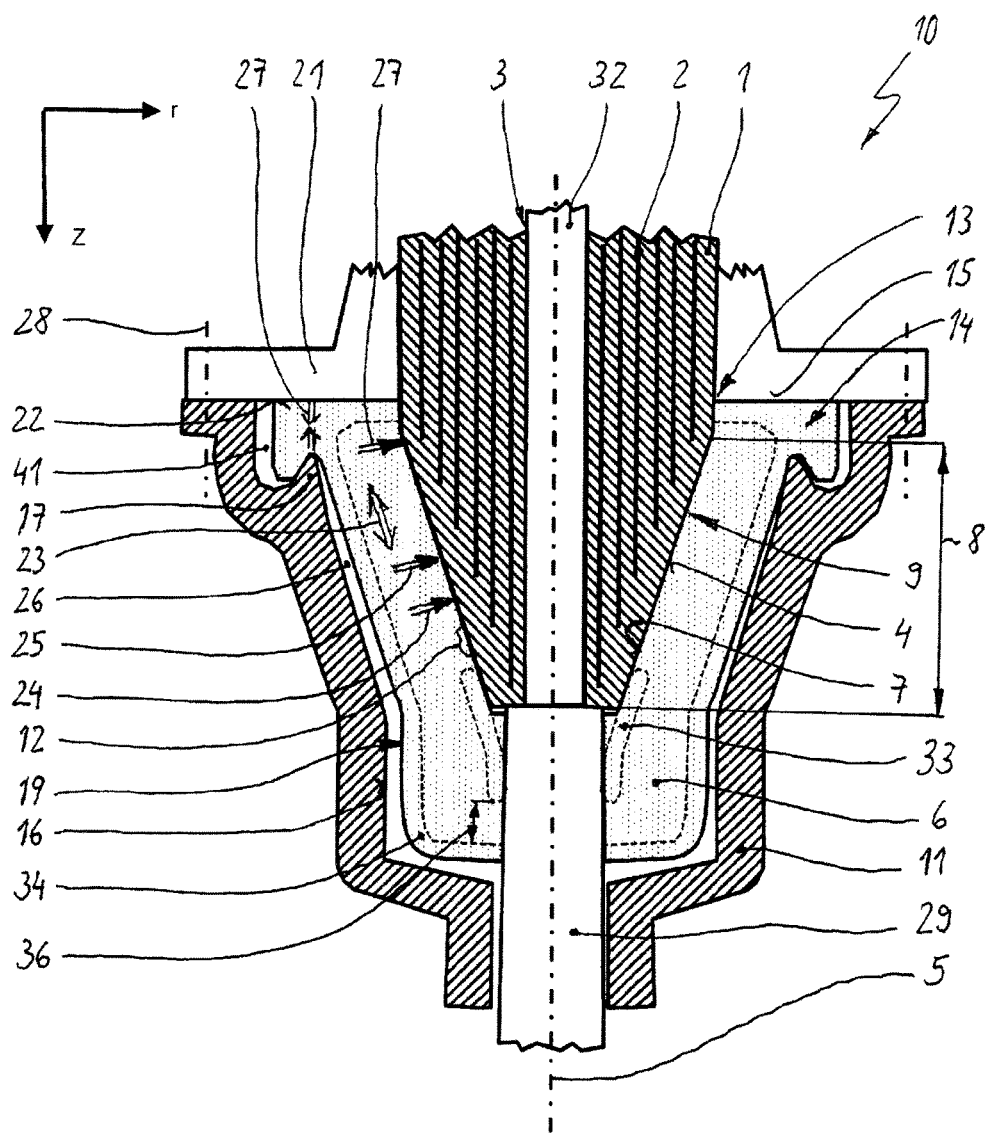

The first embodiment of the cable fitting 10 in an assembled state shown in FIG. 1 has a rigid core insulator 1 that is formed as a condenser core comprising a plurality of aluminum field grading layers 2 enclosed in between neighboring spacer layers made of a composite material comprising a fiber-based spacer, and epoxy resin (not shown in detail). The spacer can be made of organic polymer fibers or glass fibers. The epoxy resin can be filled by inorganic material, for example quartz powder.

The rigid core insulator 1 has a cavity 3 for receiving a nominal conductor 32. The core insulator 1 further has a first conical outer surface 4 extending concentrically about a longitudinal axis 5 defined by the columnar overall shape of the cable fitting.

An elastomeric stress relief element 6 has a first conical inner surface 7 is designed for mating the first conical outer surface 4 over a predefined length 8 at an interface 9.

The cable fitting 10 further has a rigid member 11 formed as a casing having a bell-shaped cross section. The rigid member/casing 11 is designed for receiving the cup-shaped stress relief element 6 and for pressurizing the elastomeric stress relief element 6 at the interface 9. The stress relief element 6 is cup-shaped and has an opening 13 formed by the first conical inner surface 7 and a circumferential collar 14 directed radially outwards and a first end face 15 located at the entry of said opening 13.

At a given annular zone 12 on the interface 9 a diameter of the first conical inner surface 7 is smaller than a diameter of the first conical outer surface 4 in an unassembled state of the high-voltage cable fitting. The stress relief element 6 is then pressed onto the greased first conical outer surface 4 of the rigid core insulator 1 such that the elastic stress relief element 6 adheres snugly on the core insulator 1 and exerts a first radial compression force 24 on it.

The rigid casing 11 has an inner contour 16 for receiving and directed towards the stress relief element 6. A pressure enhancing portion 17 is located at the inner contour 16 such that it engages with the collar 14 such that an additional axial expansion stress 23 indicated by double headed arrows is caused in a sleeve portion 19 of the stress relief element 6 extending along the first conical outer surface 4. In FIG. 1, the pressure enhancing portion 17 has a horn-shaped cross-section extending circumferentially about the longitudinal axis 5.

The cable fitting 10 has further a rigid flange 21 extending circumferentially extending about the rigid core insulator 1. The flange 21 has a second end face 22 that is directed towards the first end face 15 of the stress relief element.

The pressure enhancing portion 17 is pulling the collar 14 towards the second end face 22 and thus creating additional axial expansion stress 23 indicated by second double headed arrows in the sleeve portion 19 of the stress relief element 6. The additional axial expansion stress 23. As a result, a first radial compression force 24 resulting from the press-fitting process is increased by a second radial compression force 25 resulting from the additional axial expansion stress 23 caused by the pressure enhancing portion 17 such that a very satisfactory interface quality with no substantial voids is achieved and a total radial pressure of around 0.3 MPa is generated at the interface 9. The first radial compression force 24 and the second radial compression force 25 are shown outside the given annular zone 12 only for clarity reasons of FIG. 1 but are present in said given annular zone 12. The given annular zone 12 is a mere representative of any spot at the interface 9 along the predefined length 8.

A first radial gap 26 is present between the sleeve portion 19 and the inner contour 16 of the rigid casing. Radially outside of the collar 14, an annular second gap 41 is present.

Since the first end face 15 of the collar 14 is abutting the rigid second end face 22 of the flange 21 in an assembled state of the first embodiment 10 such that the collar 14 is axially squeezed, an axial compression force 27 (indicated by a double-headed arrow pointing against one another) is caused in the collar 14. Said axial compression force 27 inevitably leads to a third radial compression force 27 at the opening 13 along the first conical outer surface 4 of the core insulator 1.

The rigid casing 11 and the rigid flange 21 are made of metal, whereas the elastomeric stress relief element 6 is made of elastomeric material, such as rubber, for example silicone rubber or EPDM rubber.

The rigid flange 21 and the rigid casing 11 are fastened together by a number of bolts 28 provided at a circumferential portion of the cable fitting 10.

In an assembled state of the cable fitting 10, a high voltage cable 29 is connected to the nominal conductor 32. An electrically conductive connector shield 33 (indicated only by dotted lines for clarity reasons) is integrated into the stress relief element 6 such that it contacts the first conical outer surface 4 of the core insulator 1 at its thinner end as well as the insulation of the high voltage cable 29. Moreover, an electrically conductive field deflector 34 (indicated only by dotted lines for clarity reasons) is integrated into the stress relief element 6 such that it contacts the first conical outer surface 4 of the columnar core insulator 1 at its thicker end and extends over an outer surface 35 of the stress relief element 6 to the high voltage cable 29 such that the connector shield 33 and the field deflector 34 are arranged at a predefined distance 36 from one another. The connector shield 33 and the field deflector 34 are made of and elastomeric material with an appropriate admixture providing electrical conductivity, for example electrically conductive carbon black.

Figure 2:
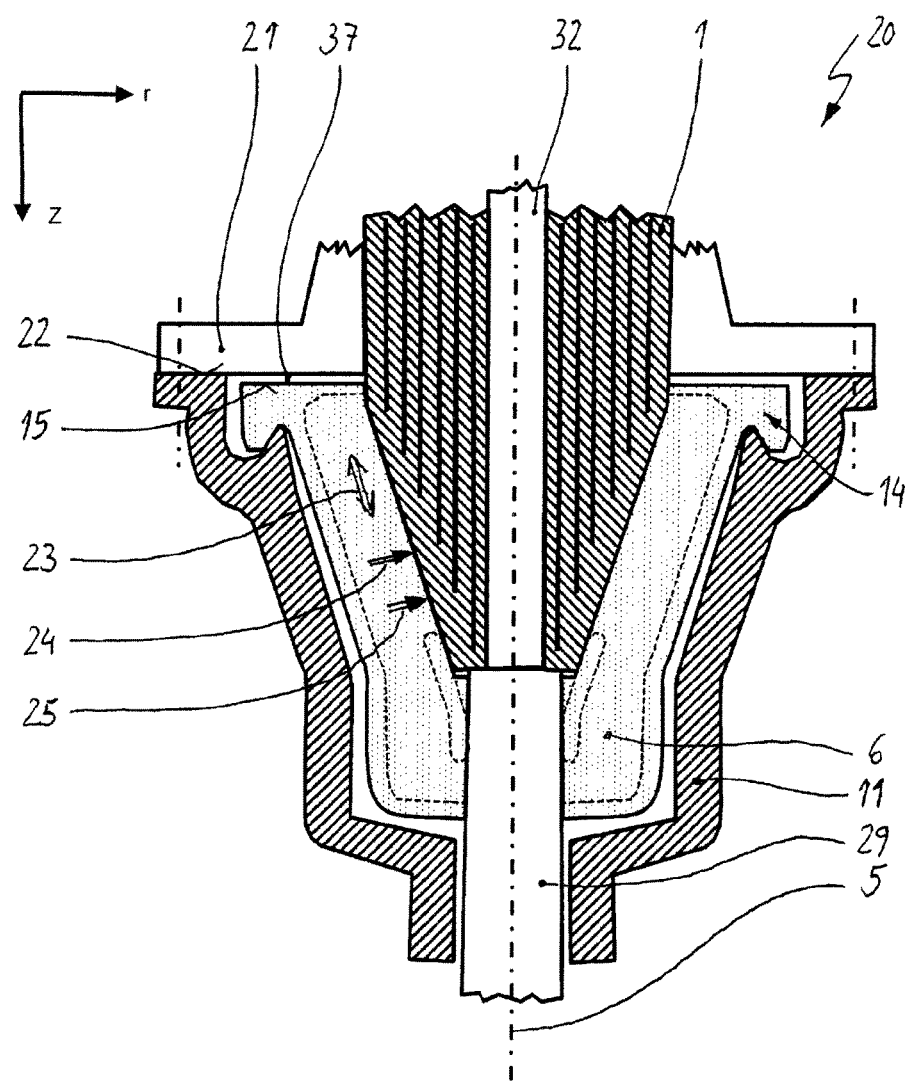
FIG. 2 a cross section of a second embodiment of the cable fitting along the longitudinal axis.

The second embodiment of a cable fitting 20 shown in FIG. 2 differs to the first embodiment 10 only very little. Hence, only the differences of the second embodiment 20 with respect to the first embodiment 10 are addressed and explained hereinafter.

In the second embodiment of the cable fitting 20, there is a ring-shaped third gap 37 in between the first end face 15 of the stress relief element 6 and the second end face 22 of the flange 21. Owing to the presence of the third gap 37, no third radial compression force 27 is present at the opening 13 along the first conical outer surface 4 of the core insulator 1. However, the first radial compression force 24 and the second radial compression force 25 are present in the sleeve portion 19 again.

Figure 3:
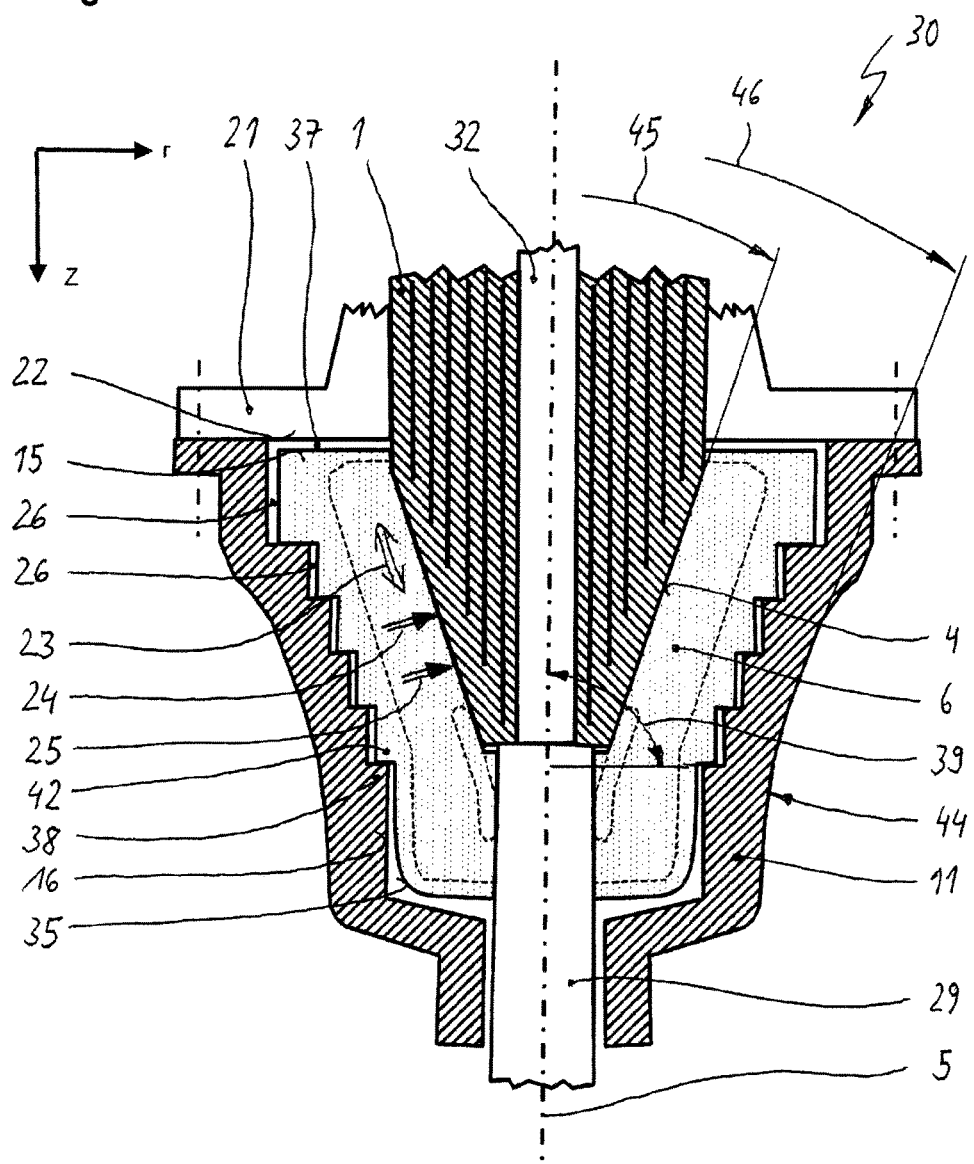
FIG. 3 a cross section of a third embodiment of the cable fitting along the longitudinal axis.

The third embodiment of a cable fitting 30 shown in FIG. 3 differs to the first embodiment 10 in that the pressure enhancing portion 17 comprises a plurality of stepped shoulders 38 arranged at the inner contour 16 at least in an area facing the first conical outer surface 4. Each of the relevant stepped shoulders 38 are inclined with respect to the longitudinal axis 5 at an inclination angle 39. A suitable grease, for example silicone grease, is provided in between the stepped shoulders 38 and the counter-shoulders 42. The stress relief element 6 has an outer contour 35 that is directed towards the rigid housing 11 and has a matching number of counter-shoulders 42 for interacting with the stepped shoulders 38 of the rigid housing 11 such that an additional axial expansion stress 23 is caused in the sleeve portion of the stress relief element in an assembled state of the cable fitting 30. The stepped shoulder—counter-shoulder combination provides for a distributed insertion of the additional axial expansion stress 23 in the stress relief element 6 in the direction of the longitudinal axis 5. The axial extension of the sleeve portion 19 owing to the additional axial expansion stress 23 leads in turn to the desired second radial compression force 25 in addition to the first radial compression force 24 resulting from the press-fitting of the stress relief element 6 onto the core insulator 1.

A ring-shaped third gap 37 is present in between the first end face 15 of the stress relief element 6 and the second end face 22 of the flange 21. Owing to the presence of the third gap 37, no third radial compression force 27 is present at the opening 13 along the first conical outer surface 4 of the core insulator 1, again.

In the third embodiment 30, the inclination angle 39 of the stepped shoulders 38 is about 90 degrees with respect to the longitudinal axis 5.

The rigid housing 11 has a bell-shaped cross-section with a tapered portion 44 whose second cone angle 46 is deviating from a first cone angle 45 of the first conical outer surface 4 less than 30 degrees with respect to the longitudinal axis 5.

Figure 4:
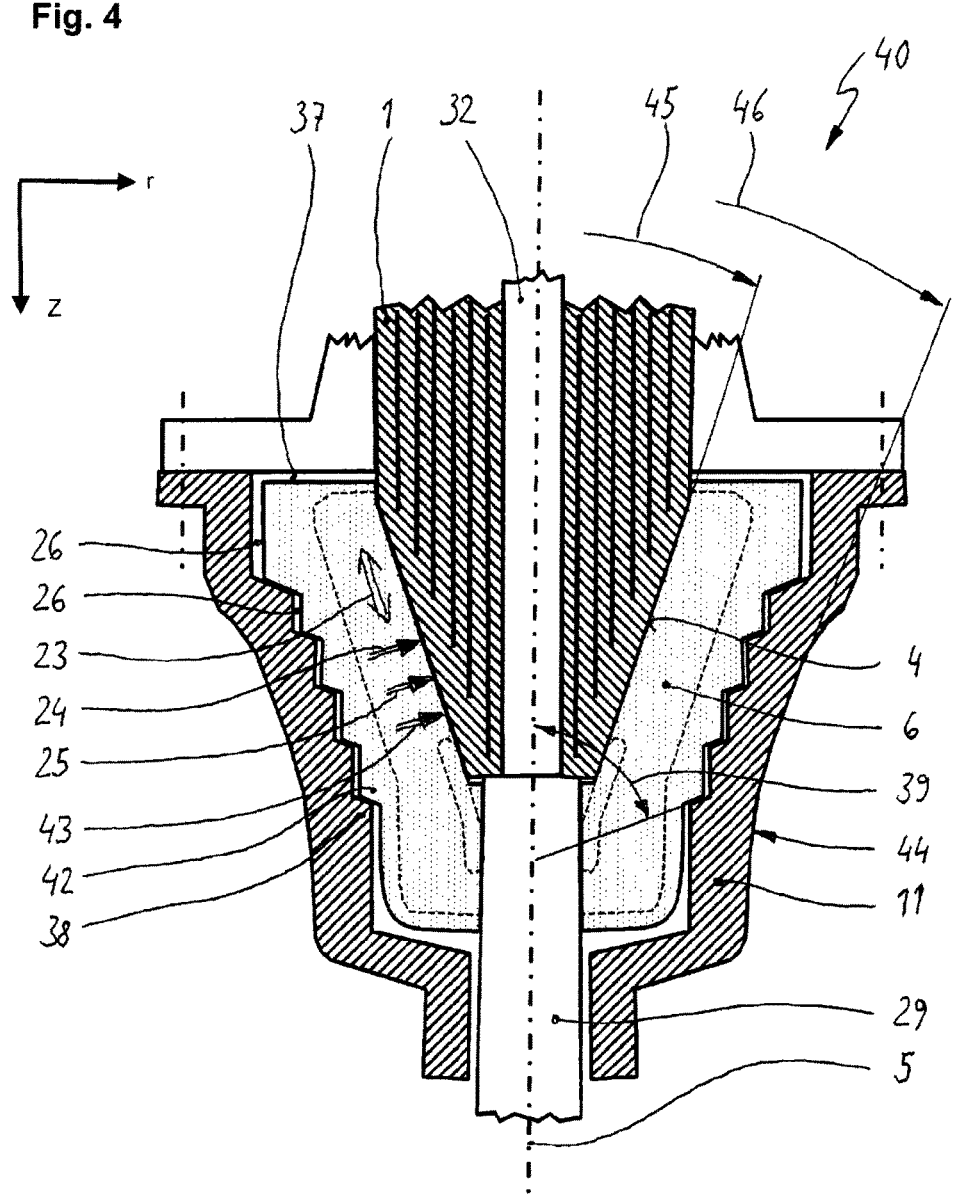
FIG. 4 a cross section of a fourth embodiment of the cable fitting along the longitudinal axis.

The fourth embodiment of a cable fitting 40 shown in FIG. 4 differs to the third embodiment 30 only to some extent. Hence, only the differences of the fourth embodiment 40 with respect to the third embodiment 30 are addressed and explained hereinafter. In the fourth embodiment of a cable fitting 40 the inclination angle 39 of the stepped shoulders 38 is in a range of 30 to 80 degrees with respect to the longitudinal axis 5. Since the stepped shoulders 38 are inclined with respect to the longitudinal axis, they not only lead to the desired additional axial expansion stress 23 and thus to the desired second radial compression force 25 but also to a fourth radial compression force 43 owing to the axial and the radial force component of the stress brought in via the shoulders 38. Therefore, the total of all radial forces acting at the interface 9 are the first radial compression force 24, the second radial compression force 25 plus the fourth radial compression force 43.

The rigid housing 11 has a bell-shaped cross-section with a tapered portion 44 whose second cone angle 46 is deviating from a first cone angle 45 of the first conical outer surface 4 less than 30 degrees with respect to the longitudinal axis 5.

Figure 5:
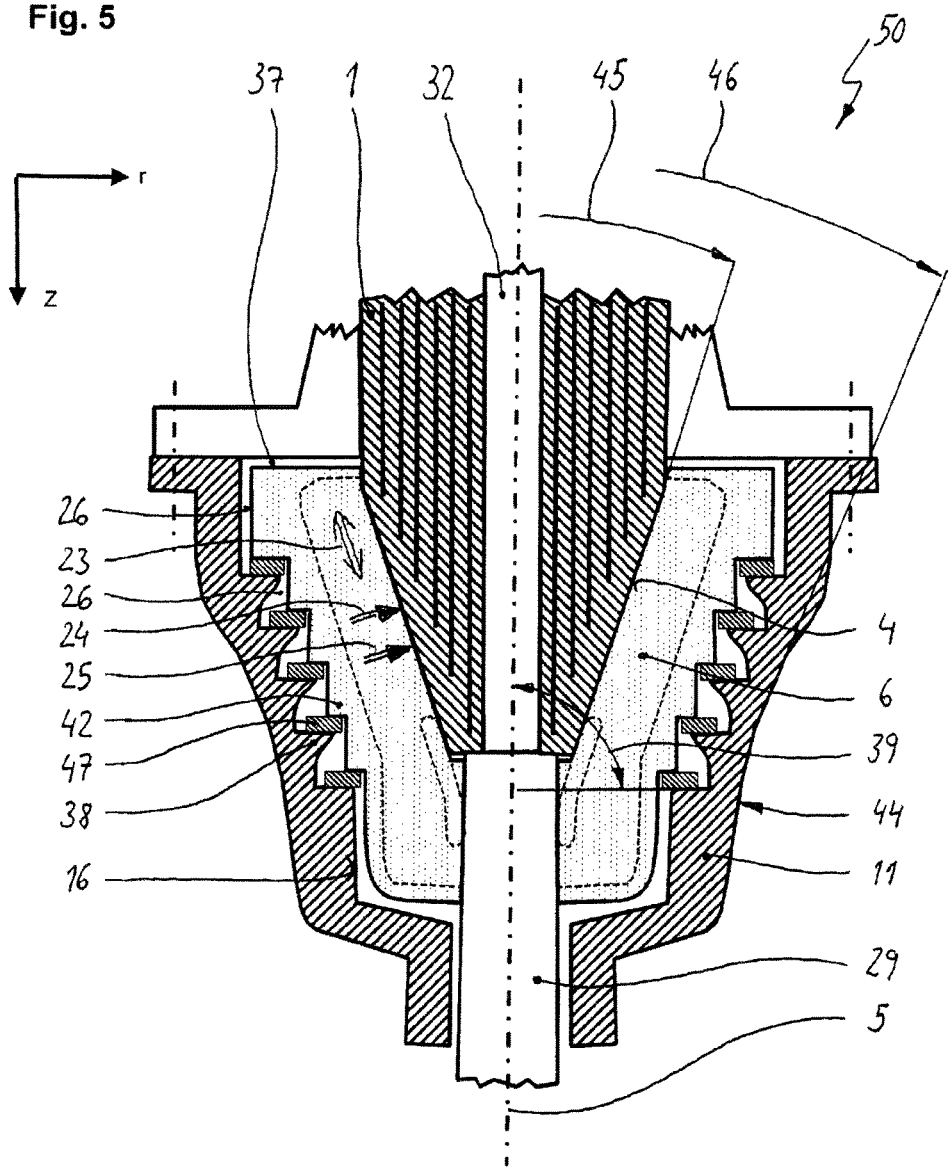
FIG. 5 a cross section of a fifth embodiment of the cable fitting along the longitudinal axis.

The fifth embodiment of a cable fitting 50 shown in FIG. 5 differs to the third embodiment 30 only to some extent. Hence, only the differences of the fifth embodiment 50 with respect to the third embodiment 30 are addressed and explained hereinafter. In the fifth embodiment of a cable fitting 50 the inner contour 16 of the housing has been adjusted such that the contact surfaces of the stepped shoulders 38 in the rigid housing 11 is increased. In addition, a metallic support ring 47 that is greased on its side matching the shoulders 38 of the rigid housing 11 is arranged in between each one of the plurality of shoulders 38 and counter-shoulders 42.

The rigid housing 11 has a bell-shaped cross-section with a tapered portion 44 whose second cone angle 46 is deviating from a first cone angle 45 of the first conical outer surface 4 less than 30 degrees with respect to the longitudinal axis 5.

Figure 6:
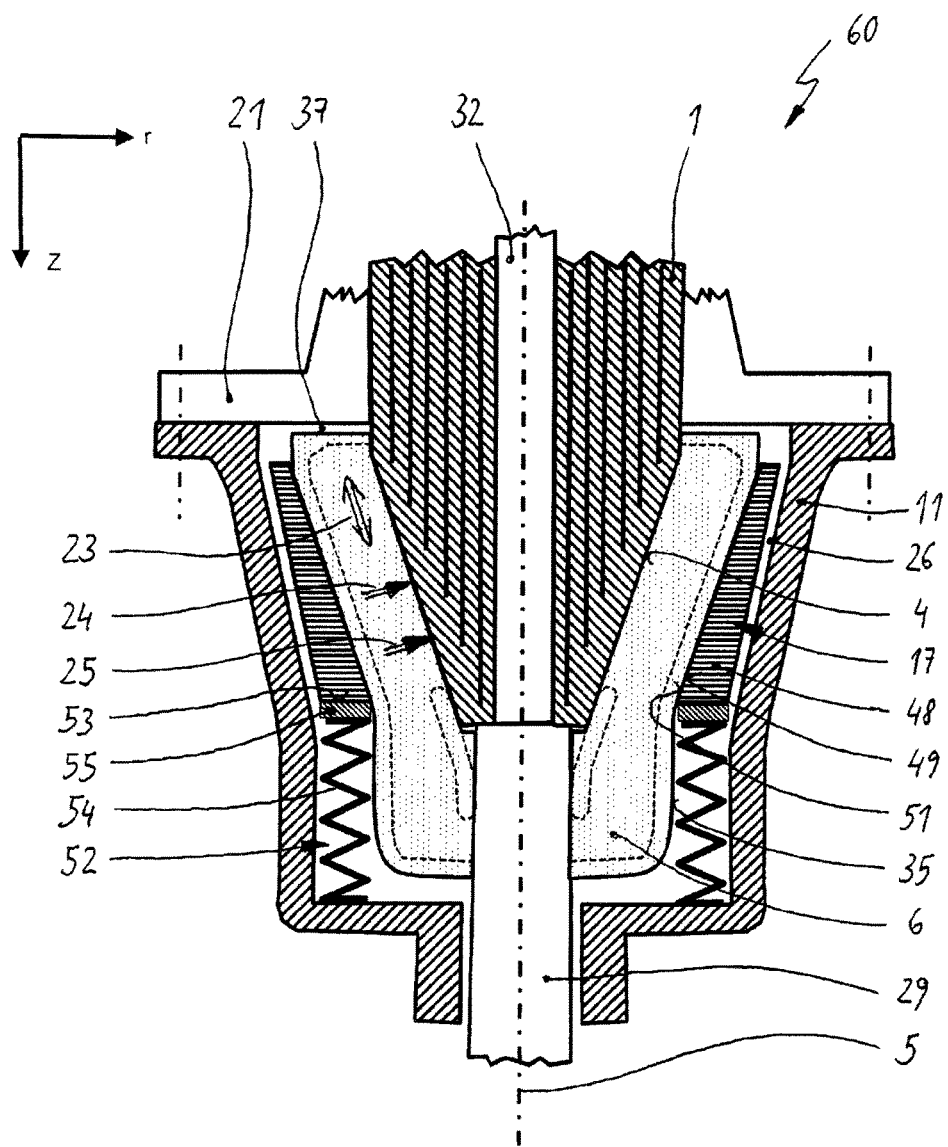
FIG. 6 a cross section of a sixth embodiment of the cable fitting along the longitudinal axis.

The sixth embodiment of a cable fitting 60 shown in FIG. 6 differs to the second embodiment 20 a fair bit. Below, only the differences of the sixth embodiment 60 with respect to the second embodiment 20 are addressed and explained. Contrary to the second embodiment 20, the housing 11 has no pressure enhancing portion 17 that is integrated directly in its inner contour 16. Instead, the pressure enhancing portion 17 belongs to a sleeve-shaped pressure body 48 provided between the stress relief member 6 and the actual housing 11. The pressure body 48 has a second conical inner surface 49 that is matching a second conical outer surface 51 that is part of the outer contour 35 of the stress relief element 6 at least in an area facing the first conical outer surface 4.

A compression system 52 is provided between an axial end face 53 of the pressure body 49 and the housing 11 for exerting an axial force on the pressure body 49 and thus causing the additional axial expansion stress 23 in the sleeve portion 19 of the stress relief element 6 in an assembled state of the cable fitting 60.

The compression system 52 comprises a plurality of compression springs 54 that are provided at periodic intervals about the longitudinal axis 5. Between the stress relief element 6 and the compression springs 54 a compression ring 55 is provided.

The size of the first radial gap 26 between the inner contour 16 of the rigid housing 11 and the stress relief element 6 is chosen that large that there remains a gap between the pressure body 48 and the inner contour 16 in order to allow free movement of the pressure body 48 in the direction of the longitudinal axis 5.

LIST OF REFERENCE NUMERALS 1 core insulator; condenser core
2 field grading layer
3 cavity
4 first conical outer surface
5 longitudinal axis
6 stress relief element
7 first conical inner surface
8 predefined length
9 interface
10,20,30,40,50,60 cable fitting
11 rigid member
12 given annular zone
13 opening
14 collar
15 first end face of stress relief element
16 inner contour of rigid member
17 pressure enhancing portion
19 sleeve portion of stress relief cone
21 rigid flange
22 second end face of flange
23 additional axial expansion stress
24 first radial compression force
25 second radial compression force
26 first radial gap
27 third radial compression force
28 bolt
29 high voltage cable
32 nominal conductor
33 connector shield
34 field deflector
35 outer contour/surface of the stress relief element
36 distance
37 ring-shaped third gap
38 stepped shoulder
39 inclination angle
41 second gap
42 counter-shoulder
43 fourth radial compression force
44 tapered portion of rigid member
45 first cone angle
46 second cone angle
47 support ring
48 pressure body
49 second conical inner surface (of the pressure body)
51 second conical outer surface of the stress relief element
52 compression system
53 axial end face of the pressure body
54 compression springs
55 compression ring

The invention claimed is:

1. A high-voltage cable fitting, comprising:
a rigid core insulator with a cavity for receiving a conductor, wherein the rigid core insulator has a first conical outer surface extending concentrically about a longitudinal axis defined by the columnar overall shape of the high-voltage cable fitting,
an elastomeric stress relief element having a first conical inner surface designed for mating the first conical outer surface over a predefined length at an interface,
a rigid member provided for pressurizing the elastomeric stress relief element at the interface, and the rigid member has at least one pressure enhancing portion extending circumferentially about the longitudinal axis for causing an additional axial expansion stress in a sleeve portion of the stress relief element extending along the first conical outer surface of the core insulator in an assembled state of the cable fitting,
wherein at a given annular zone on the interface a diameter of the first conical inner surface is smaller than a diameter of the first conical outer surface in an unassembled state of the high-voltage cable fitting, and that the stress relief element is pressed onto the rigid core insulator, and in that:
(a) the stress relief element is cup-shaped and has an opening formed by the first conical inner surface and a circumferential collar directed radially outwards and a first end face located at the entry of said opening, and in that the rigid member has an inner contour for receiving the stress relief element, wherein the pressure enhancing portion is located at the inner contour such that it engages with the collar such that an additional axial expansion stress in the sleeve portion of the stress relief element extending along the first conical outer surface of the core insulator is caused in an assembled state of the cable fitting, and the pressure enhancing portion has a horn-shaped cross-section extending circumferentially about the longitudinal axis; or
(b) the rigid member has an inner contour that is directed towards the stress relief member, wherein the pressure enhancing portion comprises a plurality of stepped shoulders arranged at that inner contour at least in an area facing the first conical outer surface, wherein the plurality of stepped shoulders are inclined with respect to the longitudinal axis about an inclination angle,
and in that the stress relief element is cup-shaped having an opening formed by the first conical inner surface, and a first end face located at the entry of said opening, wherein the stress relief element has an outer contour that is directed towards the rigid member and has a plurality of counter-shoulders for interacting with the stepped shoulders of the rigid member such that an additional axial expansion stress in the sleeve portion of the stress relief element is caused in an assembled state of the cable fitting; or
(c) the pressure enhancing portion is a sleeve-shaped pressure body provided between the stress relief member and the rigid member, wherein said pressure body has a second conical inner surface that is matching a second conical outer surface of the stress relief element at least in an area facing the first conical outer surface, and in that a compression system is provided between an axial end face of the pressure body and the rigid member for exerting an axial force on the pressure body in an assembled state of the cable fitting such that an additional axial expansion stress in the sleeve portion of the stress relief element is caused in an assembled state of the cable fitting.

2. The cable fitting according to claim 1, which further includes at least one of a ring-shaped first gap in between a lateral shell surface of the stress relief element and the inner contour of the rigid member, and a ring-shaped second gap in between the collar of the stress relief element and the inner contour of the rigid member.

3. The cable fitting according to claim 1, alternative (b), wherein the inclination angle of the stepped shoulders is about 90 degrees with respect to the longitudinal axis.

4. The cable fitting according to claim 3, which further includes a support ring arranged in between each one of the plurality of shoulders and contour-shoulders.

5. The cable fitting according to claim 1, alternative (b), wherein the inclination angle of the stepped shoulders is in a range of 30 to 80 degrees with respect to the longitudinal axis.

6. The cable fitting according to claim 1, alternative (c), wherein the compression system comprises a plurality of compression springs.

7. The cable fitting according to claim 1, wherein the cable fitting comprises a rigid flange extending circumferentially about the rigid core insulator and having a second end face directed towards the first end face of the stress relief element,
and which further includes a ring-shaped third gap in between the first end face of the stress relief element and the second end face of the flange.

8. The cable fitting according to claim 1, alternative (b), wherein the rigid member has a bell-shaped cross-section with a tapered portion whose second cone angle is deviating from a first cone angle of the first conical outer surface by less than 30 degrees with respect to the longitudinal axis.

9. The cable fitting according to claim 1, wherein the rigid core insulator is a condenser core having at least one electrically conducting field grading layer enclosed in between neighboring spacer layers.

10. The cable fitting according to claim 9, wherein the spacer layers comprise polymer or glass fibers and a hardenable resin comprising inorganic filler particles.

11. The cable fitting according to claim 1, which further includes an electrically conductive connector shield integrated into the stress relief element such that it contacts the first conical outer surface of the core insulator at its thinner end in an assembled state of the cable fitting,
and in that an electrically conductive field deflector is integrated into the stress relief element such that it contacts the first conical outer surface of the core insulator in an assembled state of the cable fitting at its thicker end and extends over an outer surface of the stress relief element.

12. A high voltage apparatus comprising a cable fitting according to claim 1, wherein a high-voltage cable is connected to the conductor and wherein the stress relief element is exerting a radial compression force on the high-voltage cable in that it is pressed on the high-voltage cable.

13. A high-voltage cable fitting, comprising:
a rigid core insulator with a cavity for receiving a conductor, wherein the rigid core insulator has a first conical outer surface extending concentrically about a longitudinal axis defined by the columnar overall shape of the high-voltage cable fitting,
an elastomeric stress relief element having a first conical inner surface designed for mating the first conical outer surface over a predefined length at an interface,
a rigid member provided for pressurizing the elastomeric stress relief element at the interface, and the rigid member has at least one pressure enhancing portion extending circumferentially about the longitudinal axis for causing an additional axial expansion stress in a sleeve portion of the stress relief element extending along the first conical outer surface of the core insulator in an assembled state of the cable fitting,
wherein at a given annular zone on the interface a diameter of the first conical inner surface is smaller than a diameter of the first conical outer surface in an unassembled state of the high-voltage cable fitting, and that the stress relief element is pressed onto the rigid core insulator, and in that:
the stress relief element is cup-shaped and has an opening formed by the first conical inner surface and a circumferential collar directed radially outwards and a first end face located at the entry of said opening, and in that the rigid member has an inner contour for receiving the stress relief element, wherein the pressure enhancing portion is located at the inner contour such that it engages with the collar such that an additional axial expansion stress in the sleeve portion of the stress relief element extending along the first conical outer surface of the core insulator is caused in an assembled state of the cable fitting, and the pressure enhancing portion has a horn-shaped cross-section extending circumferentially about the longitudinal axis.

14. A high-voltage cable fitting, comprising:
a rigid core insulator with a cavity for receiving a conductor, wherein the rigid core insulator has a first conical outer surface extending concentrically about a longitudinal axis defined by the columnar overall shape of the high-voltage cable fitting,
an elastomeric stress relief element having a first conical inner surface designed for mating the first conical outer surface over a predefined length at an interface,
a rigid member provided for pressurizing the elastomeric stress relief element at the interface, and the rigid member has at least one pressure enhancing portion extending circumferentially about the longitudinal axis for causing an additional axial expansion stress in a sleeve portion of the stress relief element extending along the first conical outer surface of the core insulator in an assembled state of the cable fitting,
wherein at a given annular zone on the interface a diameter of the first conical inner surface is smaller than a diameter of the first conical outer surface in an unassembled state of the high-voltage cable fitting, and that the stress relief element is pressed onto the rigid core insulator, and in that:
the rigid member has an inner contour that is directed towards the stress relief member, wherein the pressure enhancing portion comprises a plurality of stepped shoulders arranged at that inner contour at least in an area facing the first conical outer surface,
wherein the plurality of stepped shoulders are inclined with respect to the longitudinal axis about an inclination angle,
and in that the stress relief element is cup-shaped having an opening formed by the first conical inner surface, and a first end face located at the entry of said opening, wherein the stress relief element has an outer contour that is directed towards the rigid member and has a plurality of counter-shoulders for interacting with the stepped shoulders of the rigid member such that an additional axial expansion stress in the sleeve portion of the stress relief element is caused in an assembled state of the cable fitting.

15. A high-voltage cable fitting, comprising:
a rigid core insulator with a cavity for receiving a conductor, wherein the rigid core insulator has a first conical outer surface extending concentrically about a longitudinal axis defined by the columnar overall shape of the high-voltage cable fitting, an elastomeric stress relief element having a first conical inner surface designed for mating the first conical outer surface over a predefined length at an interface, a rigid member provided for pressurizing the elastomeric stress relief element at the interface, and the rigid member has at least one pressure enhancing portion extending circumferentially about the longitudinal axis for causing an additional axial expansion stress in a sleeve portion of the stress relief element extending along the first conical outer surface of the core insulator in an assembled state of the cable fitting, wherein at a given annular zone on the interface a diameter of the first conical inner surface is smaller than a diameter of the first conical outer surface in an unassembled state of the high-voltage cable fitting, and that the stress relief element is pressed onto the rigid core insulator, and in that:

the pressure enhancing portion is a sleeve-shaped pressure body provided between the stress relief member and the rigid member, wherein said pressure body has a second conical inner surface that is matching a second conical outer surface of the stress relief element at least in an area facing the first conical outer surface, and in that a compression system is provided between an axial end face of the pressure body and the rigid member for exerting an axial force on the pressure body in an assembled state of the cable fitting such that an additional axial expansion stress in the sleeve portion of the stress relief element is caused in an assembled state of the cable fitting.

16. The cable fitting according to claim 2, wherein the cable fitting comprises a rigid flange extending circumferentially about the rigid core insulator and having a second end face directed towards the first end face of the stress relief element, and which further includes a ring-shaped third gap in between the first end face of the stress relief element and the second end face of the flange.

17. The cable fitting according to claim 2, wherein the rigid core insulator is a condenser core having at least one electrically conducting field grading layer enclosed in between neighboring spacer layers.

* * * * *